(12) United States Patent
Chen

(10) Patent No.: US 7,228,884 B2
(45) Date of Patent: Jun. 12, 2007

(54) REAR WINDOW CAR CURTAIN

(76) Inventor: Ing-Wen Chen, No. 23, Lane 207, Kao-Feng Rd., Hsinchu (TW)

( * ) Notice: Subject to any disclaimer, the term of this patent is extended or adjusted under 35 U.S.C. 154(b) by 286 days.

(21) Appl. No.: 10/953,253

(22) Filed: Sep. 28, 2004

(65) Prior Publication Data

US 2006/0065375 A1   Mar. 30, 2006

(51) Int. Cl.
*B60J 3/00* (2006.01)
(52) U.S. Cl. ................. 160/370.22; 296/97.7
(58) Field of Classification Search ........... 160/370.22, 160/310, 311, 66; 296/97.7, 97.8
See application file for complete search history.

(56) References Cited

U.S. PATENT DOCUMENTS

| | | | | |
|---|---|---|---|---|
| 4,836,263 A | * | 6/1989 | Ament | 160/68 |
| 4,898,224 A | * | 2/1990 | Woodworth | 160/310 |
| 5,468,040 A | * | 11/1995 | Peng Hsieh et al. | 296/97.4 |
| 5,752,560 A | * | 5/1998 | Cherng | 160/370.22 |
| 6,109,330 A | * | 8/2000 | Crisp | 160/370.22 |
| 6,216,762 B1 | * | 4/2001 | Lin | 160/370.22 |
| 6,427,751 B1 | * | 8/2002 | Schlecht et al. | 160/370.22 |
| 6,557,616 B2 | * | 5/2003 | Schlect | 160/370.22 |

* cited by examiner

*Primary Examiner*—Hugh B. Thompson, II
*Assistant Examiner*—Candace L. Bradford
(74) *Attorney, Agent, or Firm*—Pro-Techtor Int'l Services

(57) ABSTRACT

A rear window car curtain comprises a base, fixed on a car body; a winding device, having a main shaft, mounted on the base, a curtain and a leading rod; a driving device with an output shaft; a threaded shaft, linked to the output shaft; left and right driving rods, engaging with the threaded shaft; left and right connecting rods, each being shaped like the letter L, with a center rotatably connected with the base; springs, inserted between the base and the left and right driving rods; wherein the springs help in pulling out the curtain and attenuate the speed of winding up the curtain.

8 Claims, 10 Drawing Sheets

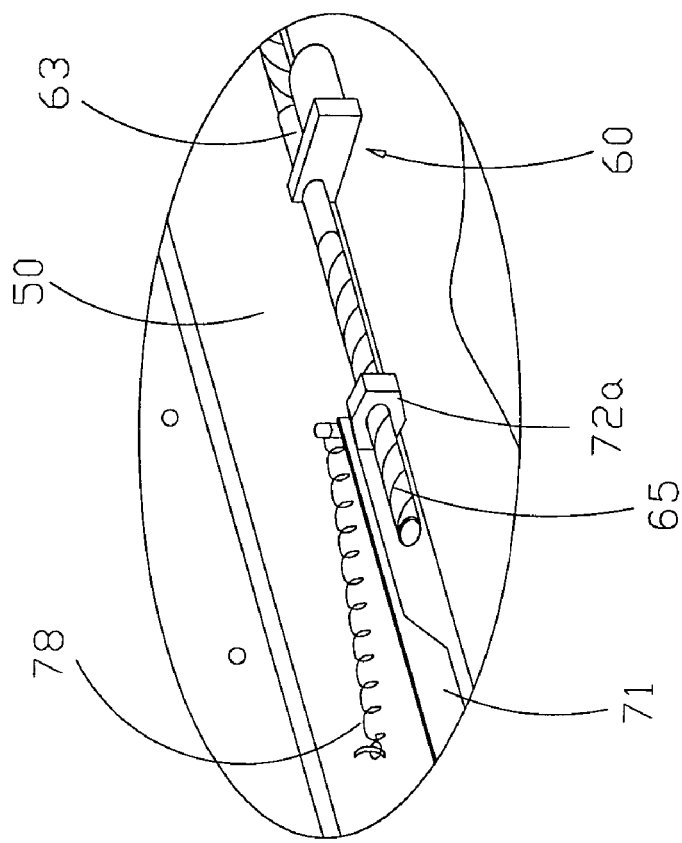
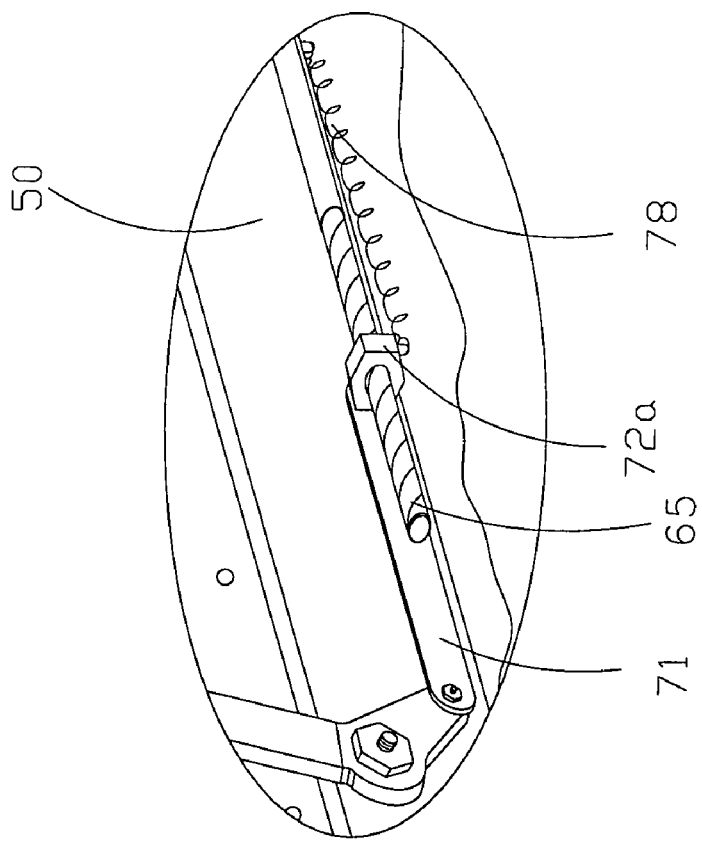
FIG 7
FIG 6

REAR WINDOW CAR CURTAIN

BACKGROUND OF THE INVENTION

1. Field of the Invention

The present invention relates to a car curtain folded by rolling up, particularly to a curtain for the rear window of a car being driven by a threaded rod engaging with nuts, with springs serving as an auxiliary drive for unfolding and attenuating too fast winding up of the curtain.

2. Description of Related Art

As shown in FIGS. 11 and 12, rear window car curtains currently used in Mercedes and Opel cars each comprise: a base 10, fixed on a car body; a winding device 15, mounted on the base 10 and having a main shaft 16, a curtain 17, and a leading rod 18; a driving device 20, mounted on the base 10 and having an output shaft 21 and a connecting piece 22; left and right driving rods 25, 26, having primary ends which are respectively connected with two opposite ends of the connecting piece 22; left and right connecting rods 30, each roughly shaped like the letter L with a center that is hingedly connected with the base 10, a relatively short endpiece 31 at a lower end which is connected with one of the left and right driving rods 25, 26 and a relatively long extension part 32 with an upper end that is glidingly connected with the leading rod 18. By above assembly, when the driving device 20 is operated, the connecting piece 22 turns in a direction indicated by arrows F, taking along the connecting rods 30, so that the endpieces 31 thereof are pulled inward, as indicated by arrows F, and the extension parts 32 turn upward, pulling the leading rod 18 upward and thus unfolding the curtain 17.

This type of car curtain is easy to operate, but has the following shortcomings.

1. During unfolding of the curtain, an uppermost position is reached only slowly or not at all.
2. During rolling up of the curtain, the curtain drops rapidly.
3. Rapid dropping of the curtain impairs stability of the mechanism.
4. Excessive forces on the mechanism cause gears to break.

SUMMARY OF THE INVENTION

It is therefore the main object of the present invention to provide a rear window car curtain with a simple structure and safe operability.

Another object of the present invention is to provide a rear window car curtain with an auxiliary driving device for an increased driving force.

A further object of the present invention is to provide a rear window car curtain with an auxiliary driving device, allowing to pull up the curtain to an uppermost position.

A further object of the present invention is to provide a rear window car curtain which is prevented from suddenly dropping.

A further object of the present invention is to provide a rear window car curtain allowing for fast and inexpensive maintenance.

The present invention can be more fully understood by reference to the following description and accompanying drawings.

DETAILED DESCRIPTION OF THE PREFERRED EMBODIMENTS

The present invention has a rolling mechanism 55 and two guiding rails 75 which are similar to prior art used in cars and therefore do not require further explanation.

As shown in FIGS. 1–10, the rear window car curtain of the present invention in a first embodiment mainly comprises: a base 50; a winding device 55, mounted on the base 50; a driving device 60, having an output shaft 61; a threaded rod 63, set on the output shaft 61; left and right driving rods 70, hingedly connected with left and right ends of the threaded rod 63, respectively; left and right connecting rods 75, hingedly connected with the left and right driving rods 70, respectively; and left and right springs 78, inserted between the base 50 and left and right connecting rods 75, respectively. By above assembly, an increased driving force for unrolling of the curtain is achieved and sudden dropping thereof is prevented. In the following, a detailed explanation is given.

The base 50 is fixed on a car body.

The winding device 55 comprises further a main shaft 56, mounted on the base 50; a curtain 57, which is folded by being wound up on the main shaft 56 and unfolded by being pulled out at a leading edge; and a leading rod 58, fixed on the leading edge of the curtain 57.

The present invention allows for variations, as elaborated below.

Referring to FIG. 8, in a first embodiment of the present invention, a driving device 60a is used which has a motor 81a and a gearbox 82a, perpendicularly oriented to the motor 81a. As shown in FIG. 9, in a second embodiment of the present invention, a driving device 60b is used which has a motor 81b and a gearbox 82b, parallelly oriented to the motor 81b. As shown in FIG. 10, in a third embodiment of the present invention, a driving device 60c is used which has a motor 81c and two gearboxes 82c mounted on opposite ends of the motor 81c. Employing gearboxes in addition to the motor results in reduced speed and increased torque. In these embodiments, the threaded rod 63 serves as output shaft.

The threaded rod 63 carries a left-handed thread 65 to the left and a right-handed thread 67 to the right. Of course, the left-handed thread 65 and the right-handed thread 67 may be swapped. The threaded rod 63 is divided into two separate rods or is integrated with the output shaft 61.

The left and right driving rods 70 each comprise an elongated plate 71 and a nut 72a, 72b, respectively. The nuts 72a, 72b respectively engage with the left-handed thread 65 and the right-handed thread 67 of the threaded rod 63 and have left-handed and right-handed inner threads.

The left and right connecting rods 75 are each roughly shaped like the letter L with a center that is hingedly connected with the base 10 at left and right ends thereof, a relatively short endpiece 76 at a lower end which is connected with one of the elongated plates 71 of the left and right driving rods 70 and a relatively long extension part 77 with an upper end that is glidingly connected with the leading rod 58.

The left and right springs 78 each have an outer end fixed on the base 50 and an inner end fastened to one of the left and right driving rods 70. As shown in FIGS. 1–6, the left and right springs 78 are mounted below the left and right driving rods 70 or, as shown in FIGS. 4 and 5, above the left and right driving rods 70. The inner ends of the left and right springs 78 are respectively fastened to the elongated plates 71 or the nuts 72a and 72b of the left and right driving rods 70 or are fastened to the endpieces 76 of the left and right connecting rods 75.

For unfolding the curtain 57, the driving device 60 is operated and turns the threaded rod 63, so that the left and right driving rods 70 are pulled inward, as indicated by arrows U. Therefore the endpieces 76 of the left and right connecting rods 75 turn inward, as well, and the extension parts 77 thereof turn upward, as indicated by arrows U, pulling the leading rod 58 upward, thus unfolding the curtain 57 until an uppermost position.

For winding up the curtain 57, the driving device 60 is operated in reverse direction. Then the threaded rod 63 turns in reverse direction, pushing the left and right driving rods 70 outward, as indicated by arrows D, so that the endpieces 76 of the left and right connecting rods 75 turn outward, as well, and the extension parts 77 thereof turn downward, as indicated by arrows D, lowering the leading rod 58, thus allowing the curtain 57 to fold.

The characteristic of the present invention lies in driving linear movements of the left and right driving rods 70 and thus raising and lowering of the curtain 57 by having the nuts 72a, 72b thereof engage with the rotating threaded rod 63 on the output shaft 61.

Another characteristic of the present invention is that a sudden blow on the leading rod 58 is borne by the nuts 72a, 72b rather than by gears within the gearbox 82, avoiding damaging thereof. Replacing the nuts 72a, 72b, as compared to repairing the gearbox 82, is fast and inexpensive, so that cost of maintenance is reduced.

As is well known, unfolding the curtain 57 using the rolling mechanism 55 requires relatively little force at the beginning and increasingly larger force thereafter. On the other hand, speed of pulling out by the driving device 60 decreases the farther the curtain has been pulled out. Therefore, a conventional curtain is pulled out rapidly at the beginning and increasingly slower thereafter, occasionally not reaching the uppermost position.

On the other hand, pulling down the curtain first has to overcome resistance, then suddenly happens rapidly due to changing torque in pulling down the curtain and changing output speed due to the driving device. Both influences cause a sudden coming down of the curtain.

To reduce high load caused by rapid falling of the curtain, the left and right springs 78 are inserted between the base 50 and the left and right driving rods 70, respectively.

As is well known, springs store and release potential energy.

Referring to FIG. 1, when the curtain 57 is unfolded, the left and right springs 78 release potential energy, helping to overcome an initial resistance and to reach the uppermost position.

Conversely, as shown in FIG. 3, when the curtain 57 is folded, the left and right springs 78 store potential energy, dampening a falling movement of the curtain 57 and preventing the driving device 60 from rolling up the curtain 57 too fast.

Referring to FIGS. 5 and 10, in the third embodiment of the present invention, the two gearboxes 82c on the motor 81c are respectively connected with a left threaded rod 63a, which engages with the nut 72a, and a right threaded rod 63b, which engages with the nut 72b. Alternatively, the left and right threaded rods 63a, 63b and nuts 72a, 72b are swapped, so that the linear movements of the left and right driving rods 70 and consequently the movements of the extension parts 77 and the curtain 57 are accordingly reversed.

BRIEF DESCRIPTION OF THE DRAWINGS

FIG. 6 is an enlarged perspective view of the area A of FIG. 3.

FIG. 7 is an enlarged perspective view of the area B of FIG. 4.

Figure 1:
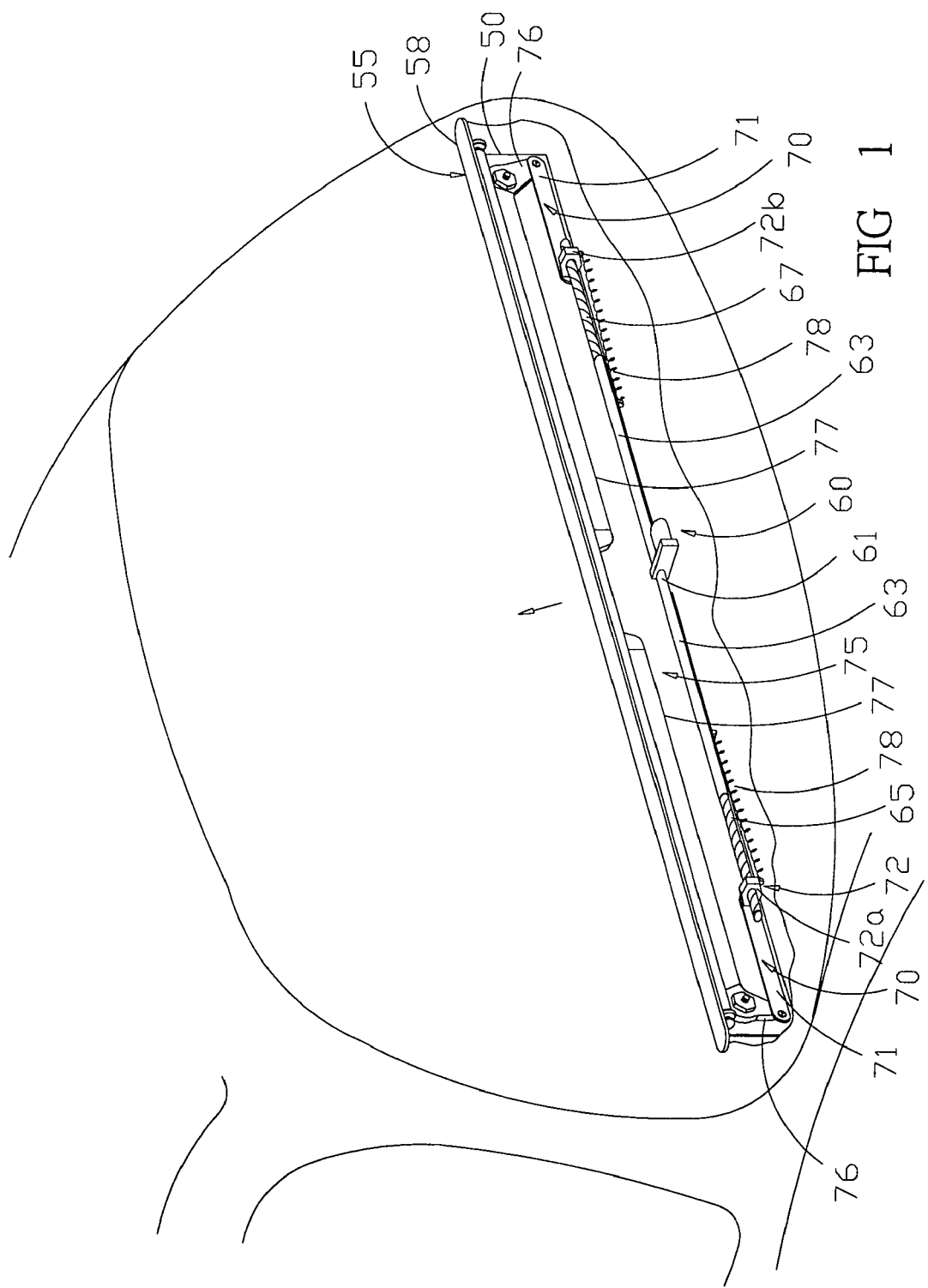
FIG. 1 is a perspective view of the rear window car curtain of the present invention, with the curtain wound up.
Figure 2:
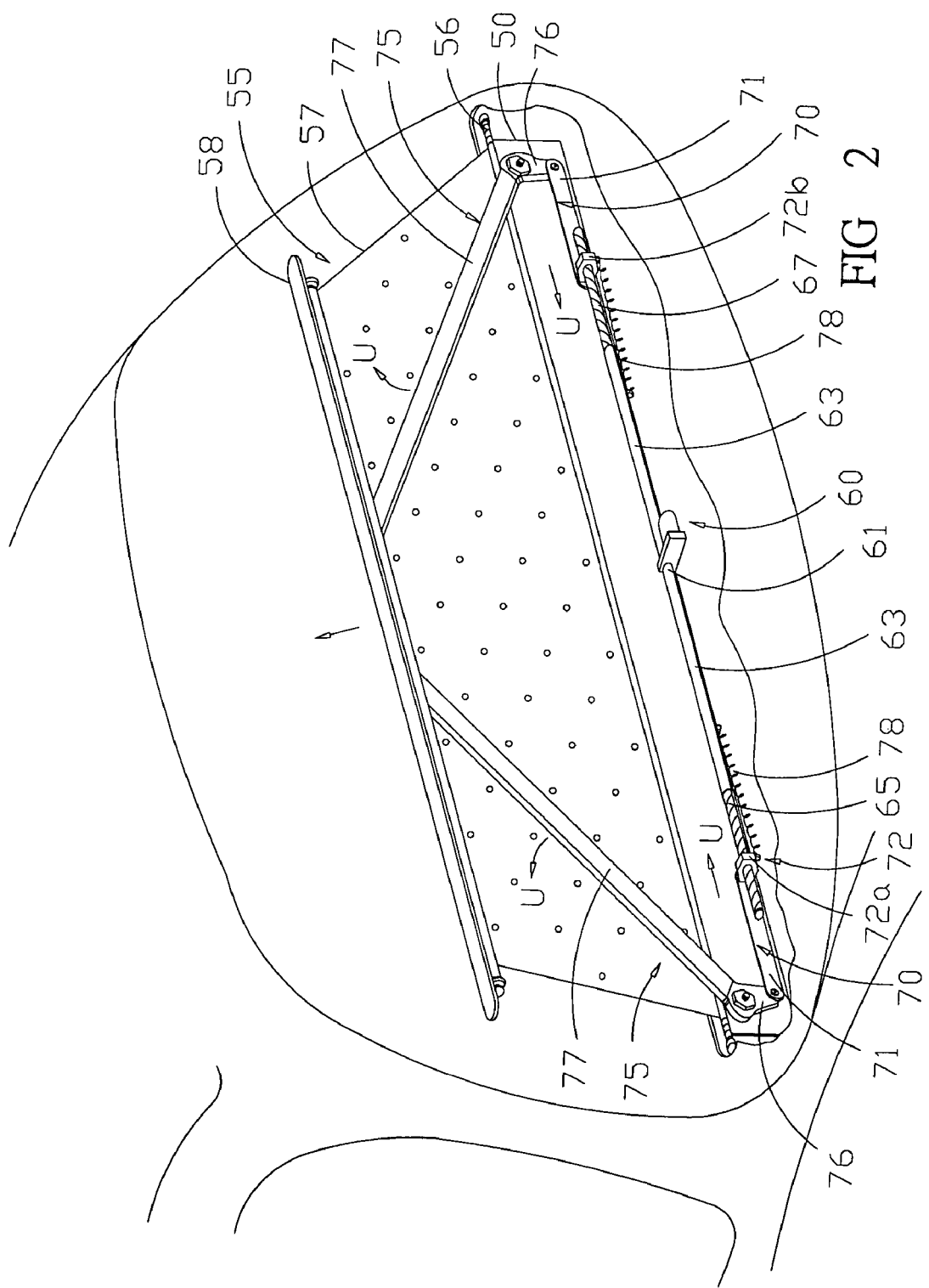
FIG. 2 is a perspective view of the rear window car curtain of the present invention, with the curtain being pulled out.
Figure 3:
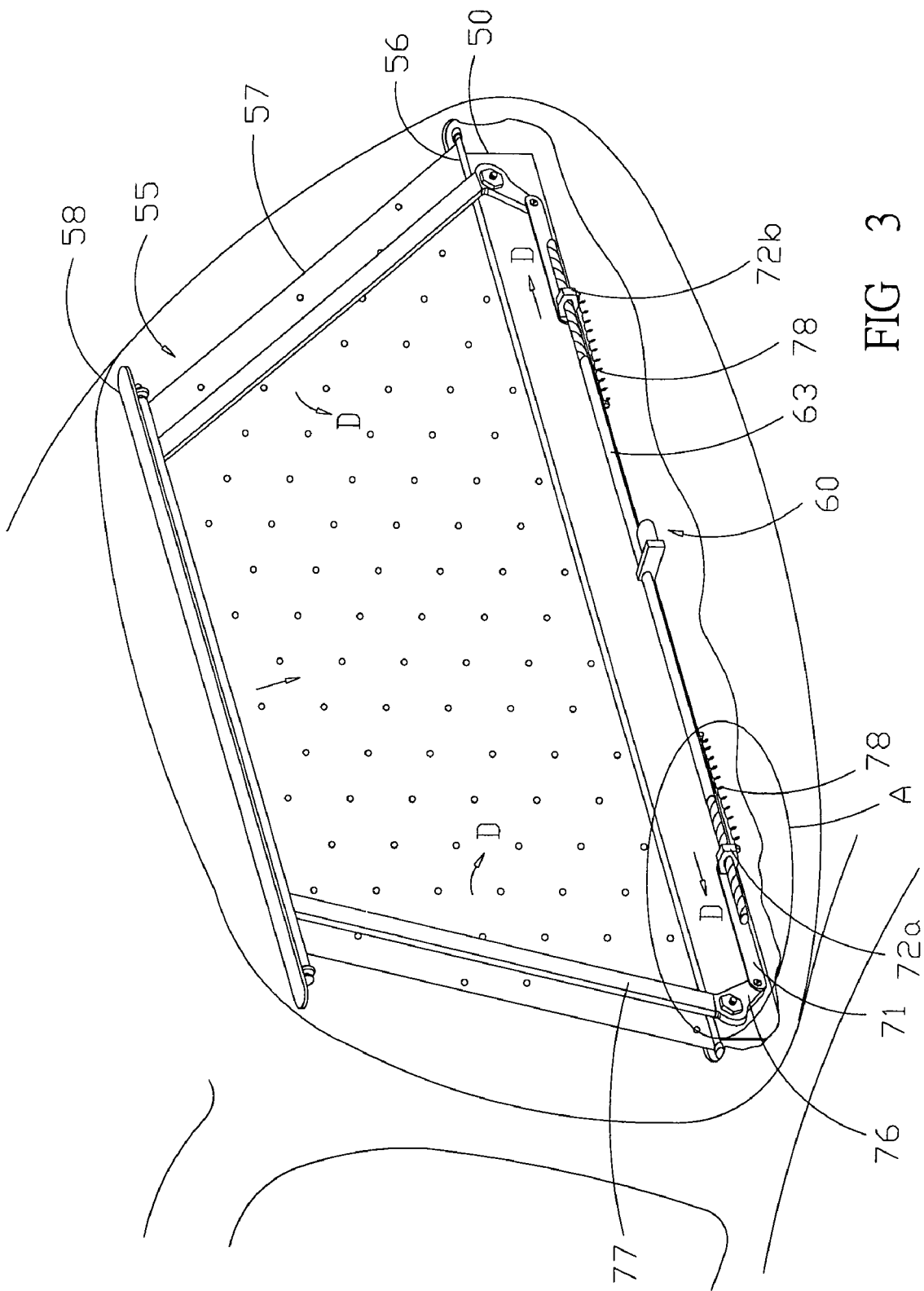
FIG. 3 is a perspective view of the rear window car curtain of the present invention, with the curtain lowered from the uppermost position.
Figure 4:
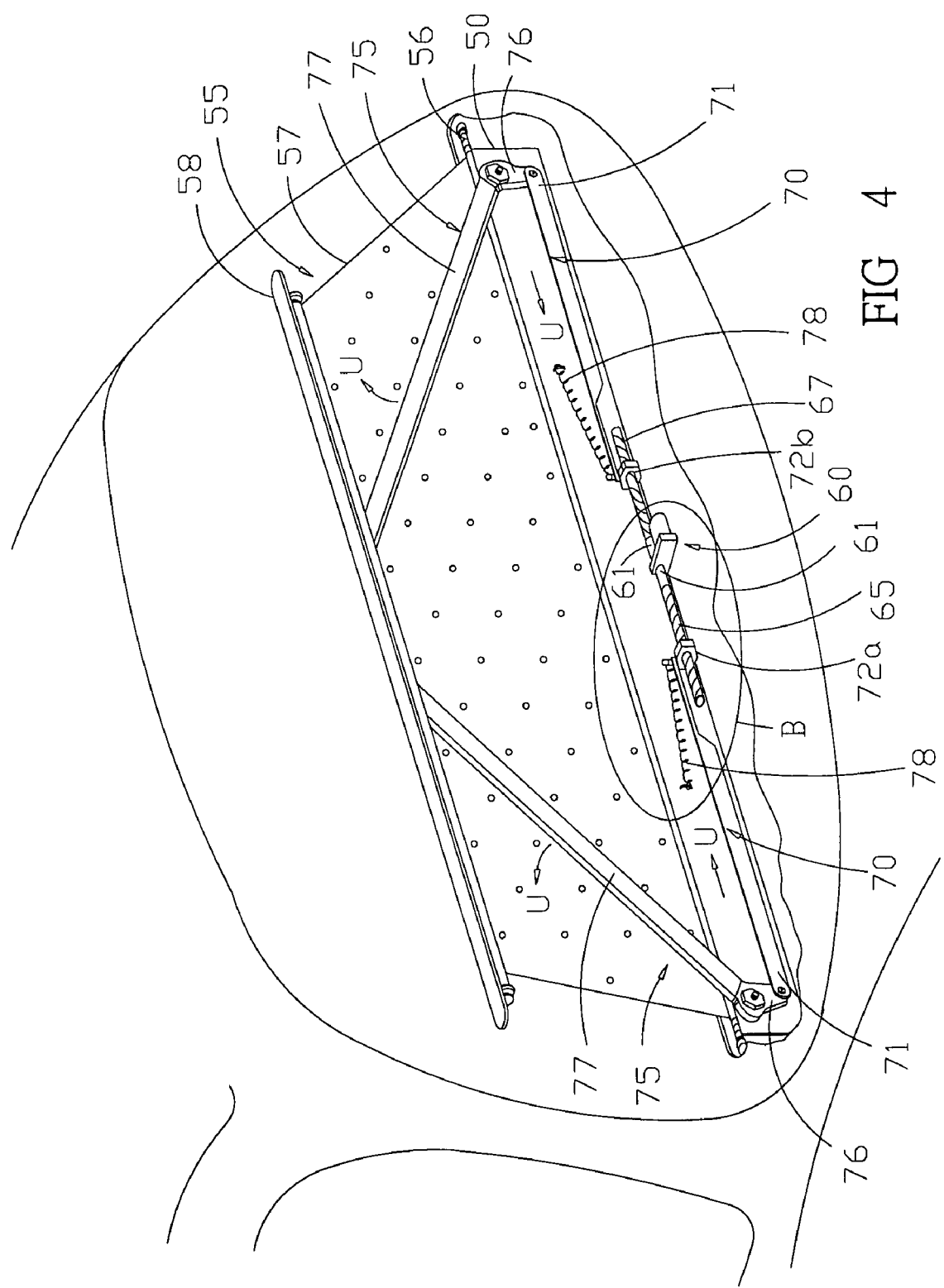
FIG. 4 is a perspective view of the rear window car curtain of the present invention, with the springs mounted above the driving rods.
Figure 5:
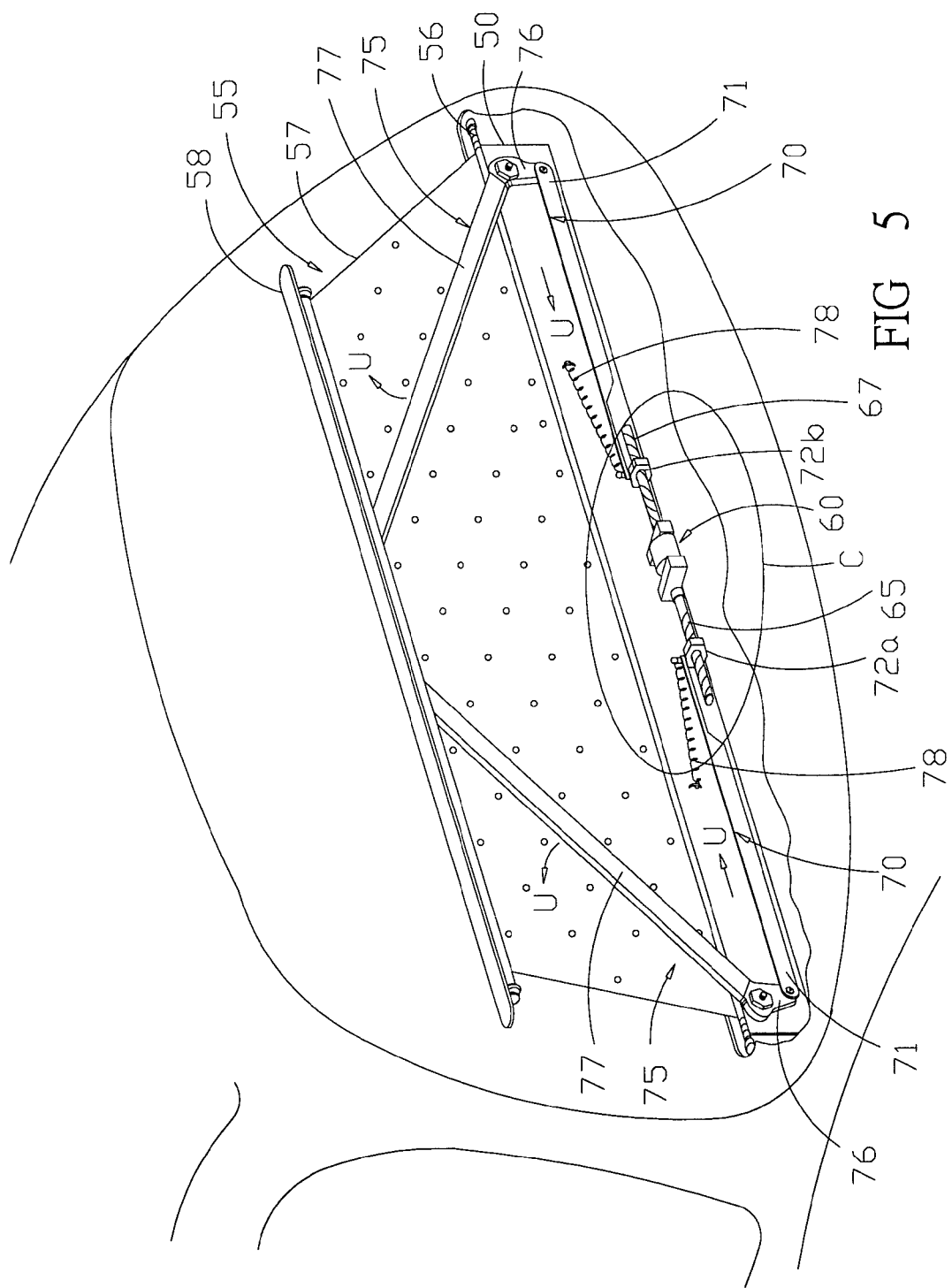
FIG. 5 is a perspective view of the rear window car curtain of the present invention in the third embodiment, with two gearboxes attached to the motor driving two threaded rods.
Figure 9:
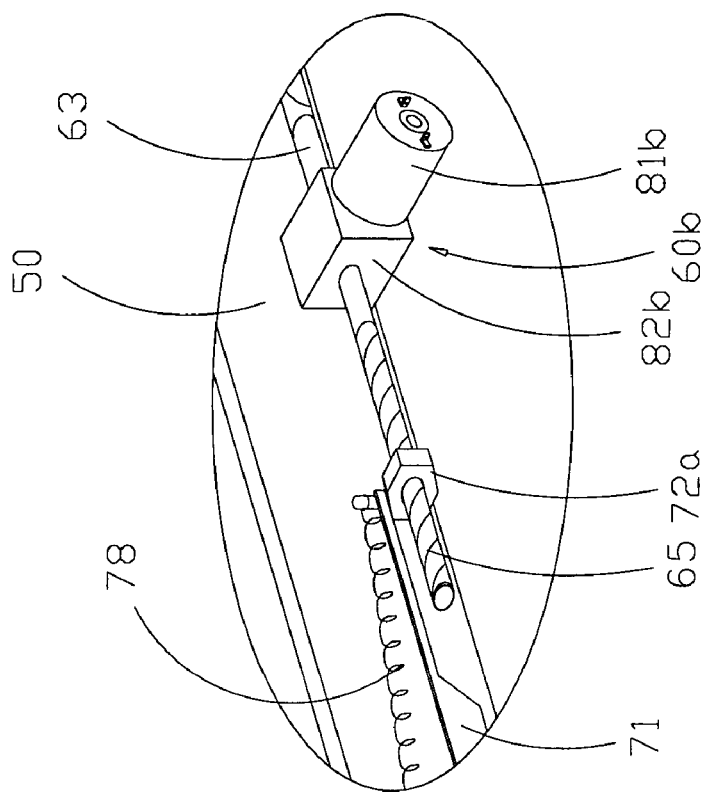
FIG. 9 is a perspective view of the driving device of the present invention in the second embodiment.
Figure 8:
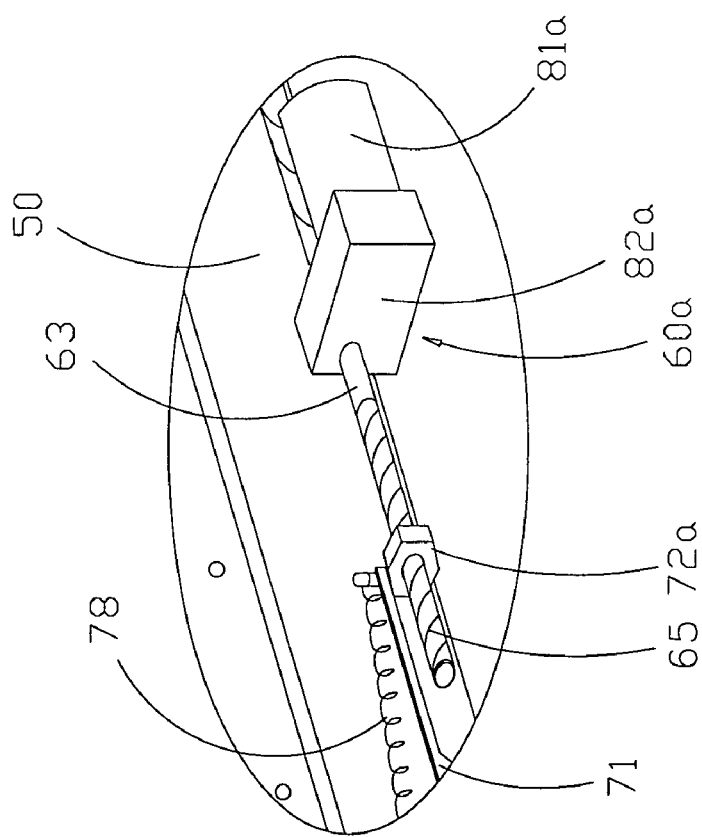
FIG. 8 is a perspective view of the driving device of the present invention in the first embodiment.
Figure 10:
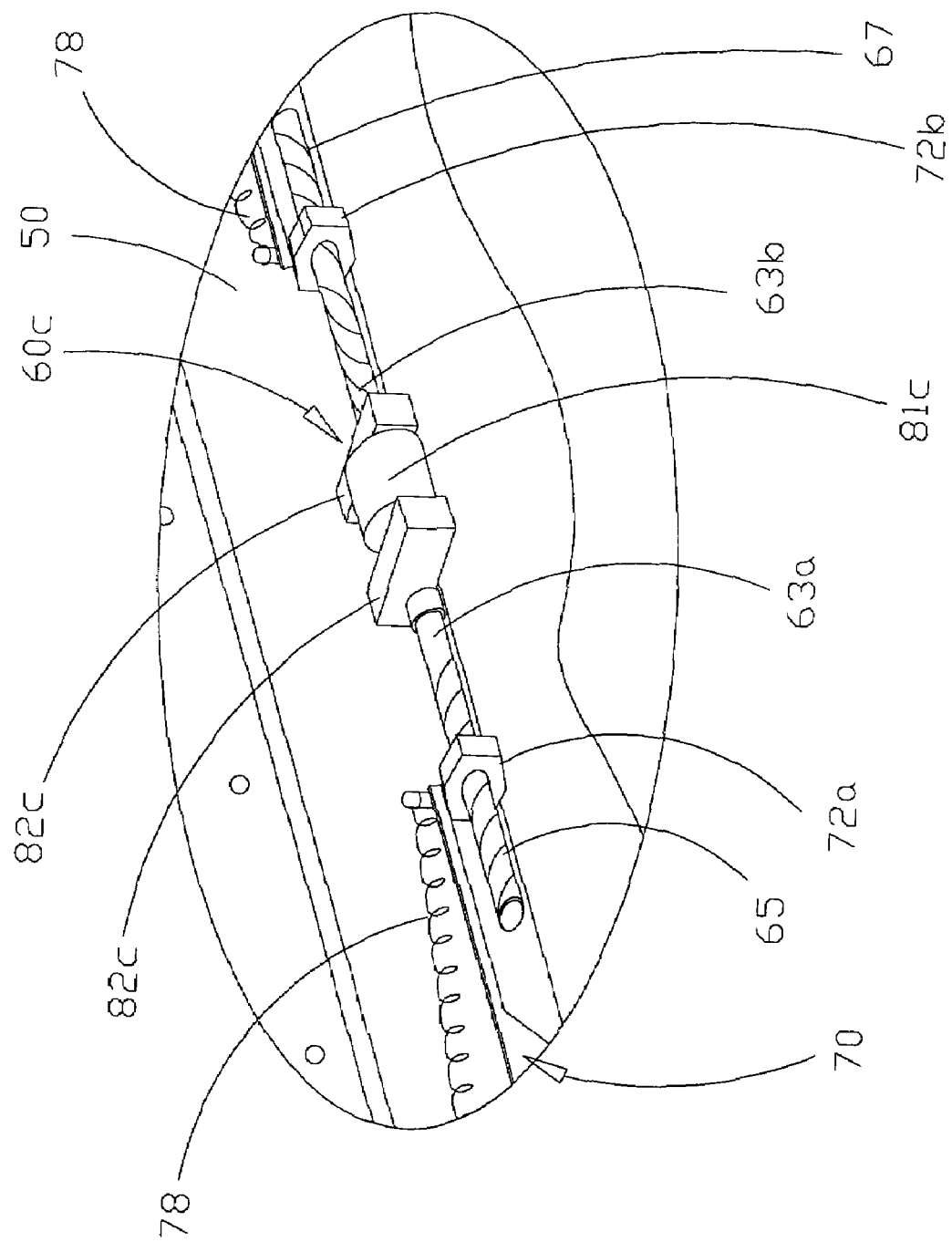
FIG. 10 is an enlarged perspective view of the area C of FIG. 5, showing the driving device of the present invention in the third embodiment.
Figure 11:
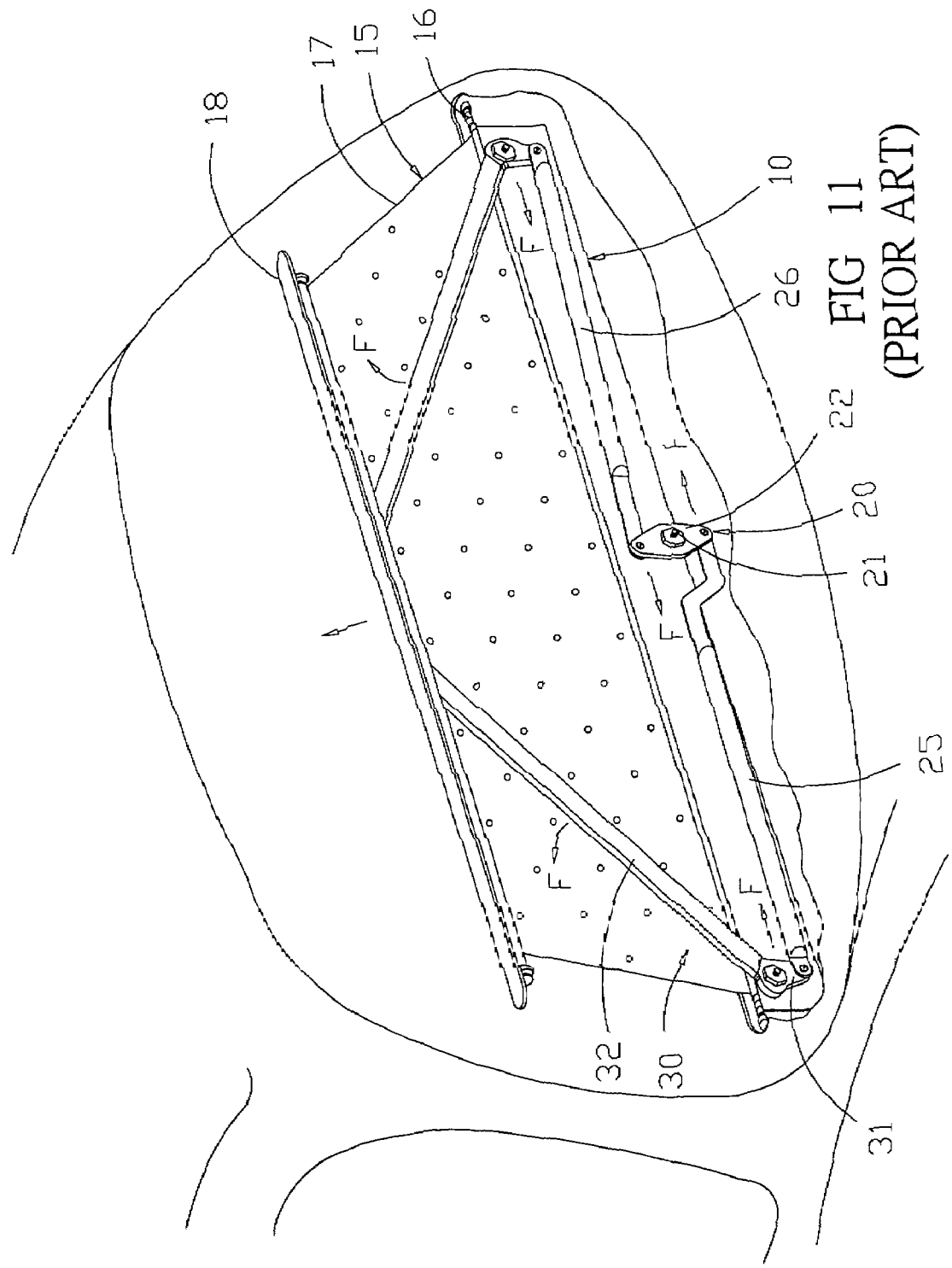
FIG. 11 is a perspective view of a conventional rear window car curtain, with the curtain in a middle position.
Figure 12:
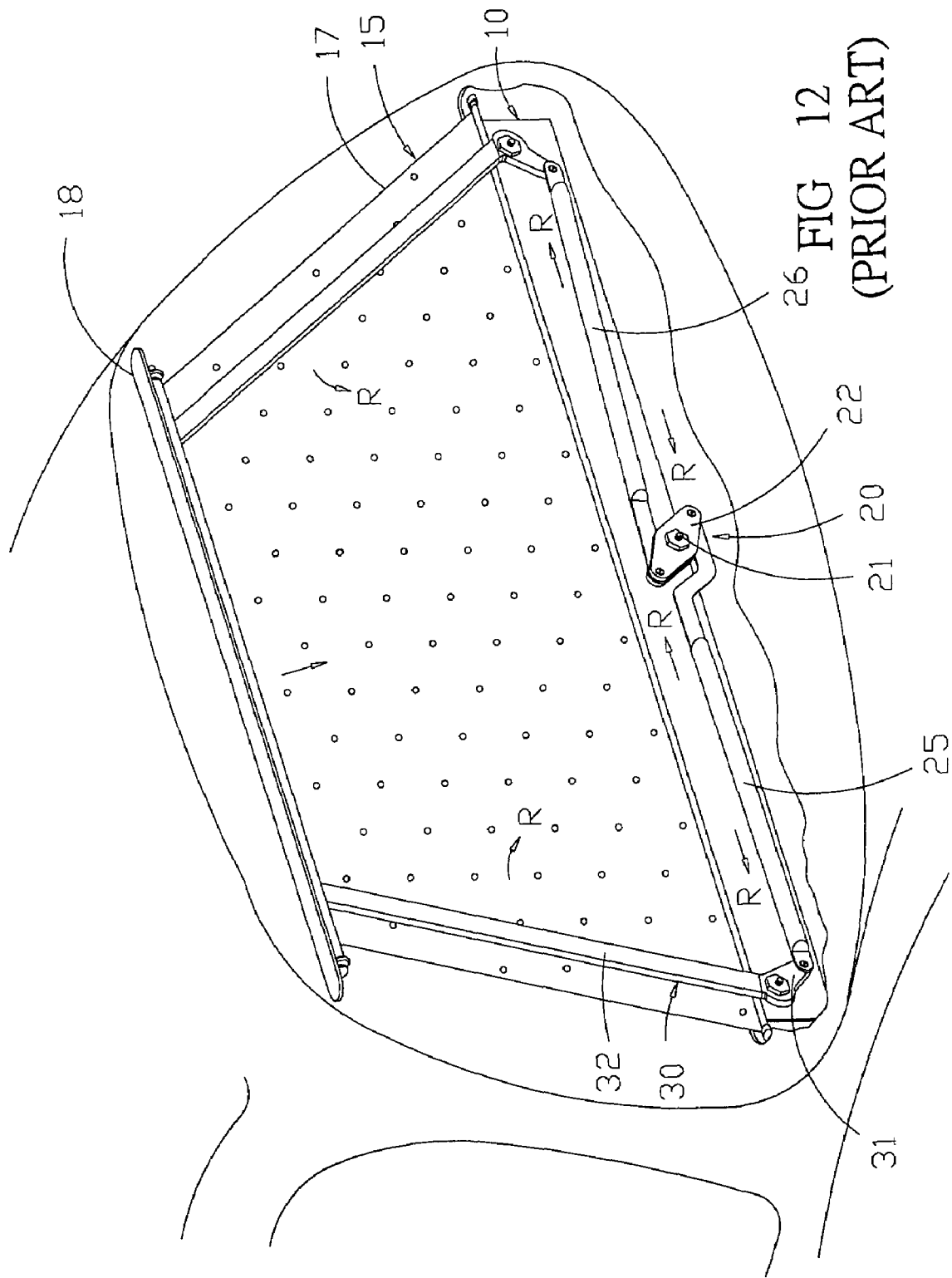
FIG. 12 is a perspective view of a conventional rear window car curtain, with the curtain in the uppermost position.

The invention claimed is:

1. A rear window car curtain, comprising:
   a base, fixed on a car body;
   a winding device, having a main shaft, mounted on said base, a curtain and a leading rod;
   a driving device with an output shaft;
   a threaded shaft, linked to said output shaft, having a left end with a left-handed thread and a right end with a right-handed thread;
   left and right driving rods, each having an elongated plate and a nut engaging with said left-handed thread and said right-handed thread respectively;
   left and right connecting rods, each being shaped like the letter L, with a center rotatably connected with said base at left and right ends thereof respectively, an endpiece with a lower end thereof rotatably connected with a respective one of said elongated plates of the left and right driving rods, and an extension part with an upper end thereof glidingly connected with a lower side of said leading rod of said winding device.

2. The rear window car curtain according to claim 1, wherein elastic elements are inserted between said left and right driving rods and said base.

3. The rear window car curtain according to claim 2, wherein said elastic elements are helical springs.

4. The rear window car curtain according to claim 1, wherein said threaded rod and said output shaft are integrated.

5. The rear window car curtain according to claim 1, wherein said driving device has a motor and a gearbox perpendicularly oriented thereto.

6. The rear window car curtain according to claim 1, wherein said driving device has a motor and a gearbox oriented parallel thereto.

7. The rear window car curtain according to claim 1, wherein said driving device has a motor and two gearboxes attached to opposite ends of said motor.

8. The rear window car curtain according to claim 1, wherein said threaded rod is divided into a left threaded rod and a right threaded rod.

\* \* \* \* \*